(12) United States Patent
Gong et al.

(10) Patent No.: US 9,897,230 B2
(45) Date of Patent: Feb. 20, 2018

(54) INTERMEDIATE BULK CONTAINER AND VALVE OPENING/CLOSING DEVICE THEREFOR

(71) Applicant: SHANGHAI HONGYAN RETURNABLE TRANSIT PACKAGINGS CO., LTD, Shanghai (CN)

(72) Inventors: Kai Gong, Shanghai (CN); Qingxin Liao, Shanghai (CN)

(73) Assignee: Shanghai Hongyan Returnable Transit Packagings Co., Ltd., Shanghai (CN)

( * ) Notice: Subject to any disclaimer, the term of this patent is extended or adjusted under 35 U.S.C. 154(b) by 176 days.

(21) Appl. No.: 14/422,133

(22) PCT Filed: Aug. 16, 2013

(86) PCT No.: PCT/CN2013/081625
§ 371 (c)(1),
(2) Date: Apr. 6, 2015

(87) PCT Pub. No.: WO2014/026634
PCT Pub. Date: Feb. 20, 2014

(65) Prior Publication Data
US 2015/0233490 A1 Aug. 20, 2015

(30) Foreign Application Priority Data

Aug. 16, 2012 (CN) .......................... 2012 1 0295527

(51) Int. Cl.
*F16K 31/60* (2006.01)
*B65D 25/52* (2006.01)
*B65D 90/66* (2006.01)

(52) U.S. Cl.
CPC .............. *F16K 31/60* (2013.01); *B65D 25/52* (2013.01)

(58) Field of Classification Search
CPC ........ F16K 31/60; F16K 31/46; F16K 31/535; B65D 90/66; B65D 25/52; B65D 19/02;
(Continued)

(56) References Cited

U.S. PATENT DOCUMENTS

| 6,045,013 A | 4/2000 | Yang |
| 6,050,545 A | 4/2000 | Stolzman |

(Continued)

FOREIGN PATENT DOCUMENTS

| CN | 201081045 | 7/2008 |
| CN | 101342956 | 1/2009 |

(Continued)

OTHER PUBLICATIONS

International search report for application No. PCT/CN2013/081625, dated Nov. 28, 2013 (8 pages).

(Continued)

*Primary Examiner* — Marina Tietjen
(74) *Attorney, Agent, or Firm* — Hamre, Schumann, Mueller & Larson, P.C.

(57) ABSTRACT

The present invention discloses a valve opening/closing device for an intermediate bulk container. the container comprises a base, side plates, and a valve provided on the base. Wherein the valve opening/closing device comprises a handle, a motion-transferring device, and a valve opening/closing mechanism, wherein the handle is mounted on the side plate and connected to the motion-transferring device, and the motion-transferring device is used to transfer the force applied on the handle to the valve, so as to open or close the valve. For the valve opening/closing device of the present invention, the operating handle is provided at an appropriate position at the side plate of the container, thereby avoiding bending over or squatting on the ground, etc when opening or closing the valve, facilitating use. In addition, the operating moment can be adjusted through adjusting the transmission ratio of the motion-transferring device, which makes it easy to control the operating force.

9 Claims, 14 Drawing Sheets

(58) Field of Classification Search
CPC .......... B65D 77/061; B65D 19/06; B65D 19/00805; B65D 19/00338
USPC .......... 251/331, 231–237, 292–293, 248
See application file for complete search history.

(56) References Cited

U.S. PATENT DOCUMENTS 6,959,914 B1 * 11/2005 Corral .................. E03C 1/021
251/293
2011/0120575 A1    5/2011 Schutz

FOREIGN PATENT DOCUMENTS

| | | | |
|---|---|---|---|
| CN | 201276237 | 7/2009 | |
| CN | 201447116 | 5/2011 | |
| CN | 202063338 | 12/2011 | |
| CN | 102322536 A * | 1/2012 | ............ F16K 5/204 |
| CN | 102808989 | 12/2012 | |
| CN | 102840381 | 12/2012 | |
| CN | 202852157 | 4/2013 | |
| CN | 202992355 | 6/2013 | |
| CN | 203099049 | 7/2013 | |
| FR | 2959255 | 10/2011 | |
| WO | WO 2013034032 A1 * | 3/2013 | ............ F16K 5/204 |

OTHER PUBLICATIONS

Extended European Search Report for application No. 13829788.2, dated Apr. 11, 2016 (6 pages).

* cited by examiner

INTERMEDIATE BULK CONTAINER AND VALVE OPENING/CLOSING DEVICE THEREFOR

FIELD

The present invention relates to a container, in particular to a valve opening/closing device for an intermediate bulk container.

BACKGROUND

The valve opening/closing device of an existing intermediate bulk container is typically provided at the valve base, thus an operator has to bend over or squat on the ground to operate when opening or closing the valve, which is very inconvenient.

US publication No. 20030102309A discloses some similar containers provided with a valve, wherein the valve opening/closing device is installed on the valve. When opening or closing the valve, an operator has to bend over or Squat on the ground to operate, which is very inconvenient.

SUMMARY

The object of the present invention is to provide a valve opening/closing device, with which an operator can open or close the valve without bending over or squatting on the ground.

To achieve the object described above, the present invention provides a valve opening/closing device for an intermediate bulk container, the container comprises a base, side plates, and a valve provided on the base, wherein the valve opening/closing device comprises a handle, a motion-transferring device, and a valve opening/closing mechanism, wherein the handle is mounted on the side plate and connected to the motion-transferring device, and the motion-transferring device is used to transfer the force applied on the handle to the valve, so as to open or close the valve.

In a preferred embodiment of the present invention, the motion-transferring device comprises a transmission rod, a driving gear, a reversing gear, a driven gear, and a connection rod; one end of the transmission rod is connected to the handle and the other end of the transmission rod is connected to the driving gear; one end of the connection rod is connected to the valve opening/closing mechanism and the other end of the connection rod is connected to the driven gear; and the driving gear is engaged with the reversing gear and the reversing gear is engaged with the driven gear.

In the embodiment described above, the opening/closing structure is a valve stem and the valve stem is connected to the connection rod.

In the embodiment described above, the handle is mounted on the side plate of the container though a handle fixing base and can rotate around a vertical axis.

In a preferred embodiment of the present invention, the motion-transferring device comprises a transmission rod, a driving pulley, a driven pulley, a belt, and a connection rod; one end of the transmission rod is connected to the handle and the other end of the transmission rod is connected to the driving pulley; one end of the connection rod is connected to the valve opening/closing mechanism and the other end of the connection rod is connected to the driven pulley; and the driven pulley is driven by the driving pulley through the belt.

In another preferred embodiment of the present invention, the motion-transferring device comprises a steel rope, a pulley assembly, a rack assembly, a reversing gear, a driven gear, and a connection rod; the steel rope is connected to the handle and the pulley assembly, and can move synchronously with the rotation of the handle; the steel rope is further connected to the rack assembly so that the rack assembly can move synchronously with the movement of the steel rope; one end of the connection rod is connected to the valve opening/closing mechanism and the other end of the connection rod is connected to the driven rod; and the rack assembly is engaged with the reversing gear and the reversing gear is engaged with the driven gear.

In the embodiment described above, the handle is provided with a grip, a steel rope slot and a rotation axle, and can rotate around the rotation axis of the rotation axle; the rack assembly comprises a rack and a rack seat, wherein the steel rope is connected to the rack through steel rope fixing heads and can slide along a slot of the rack seat; and the valve opening/closing mechanism is a valve stem.

In the embodiment described above, the handle is provided with a grip and a steel rope limiting block, wherein the steel rope limiting block limits movement of the steel rope relative to the handle and functions as a slid member, thus the handle can slid along the slot of the side plate and the steel rope can move synchronously when the handle slides.

In another preferred embodiment of the present invention, the motion-transferring device is a transmission rod and the valve opening/closing mechanism is a valve stem, wherein one end of the transmission rod is provided with a structure connected to the handle and the other end of the transmission rod is provided with a structure connected to the valve stem, thus the rotation of the handle can drive the transmission rod and the valve stem to rotate.

The present invention further provides an intermediate bulk container, which comprises a base, side plates, a liner, and a valve, wherein the container further comprises the valve opening/closing device according to the all embodiments described above.

For the valve opening/closing device according to the present invention, the operating handle is provided at an appropriate position at the side plate of the container, thereby avoiding bending over or squatting on the ground, etc when opening or closing the valve, facilitating use. Further, when the motion-transferring device is installed inside the side plate, in use, the overall volume ratio of the intermediate bulk container will not be affected, and level of folding will not be increased when folding the intermediate bulk container. Moreover, the operating handle or lever on the side plate can be made with moment arms of different sizes, different lengths, or the operating movement can be changed through adjusting the transmission ratio of the motion-transferring device, which makes it easy to control the operating force.

DRAWINGS

DETAILED DESCRIPTION

Figure 1:
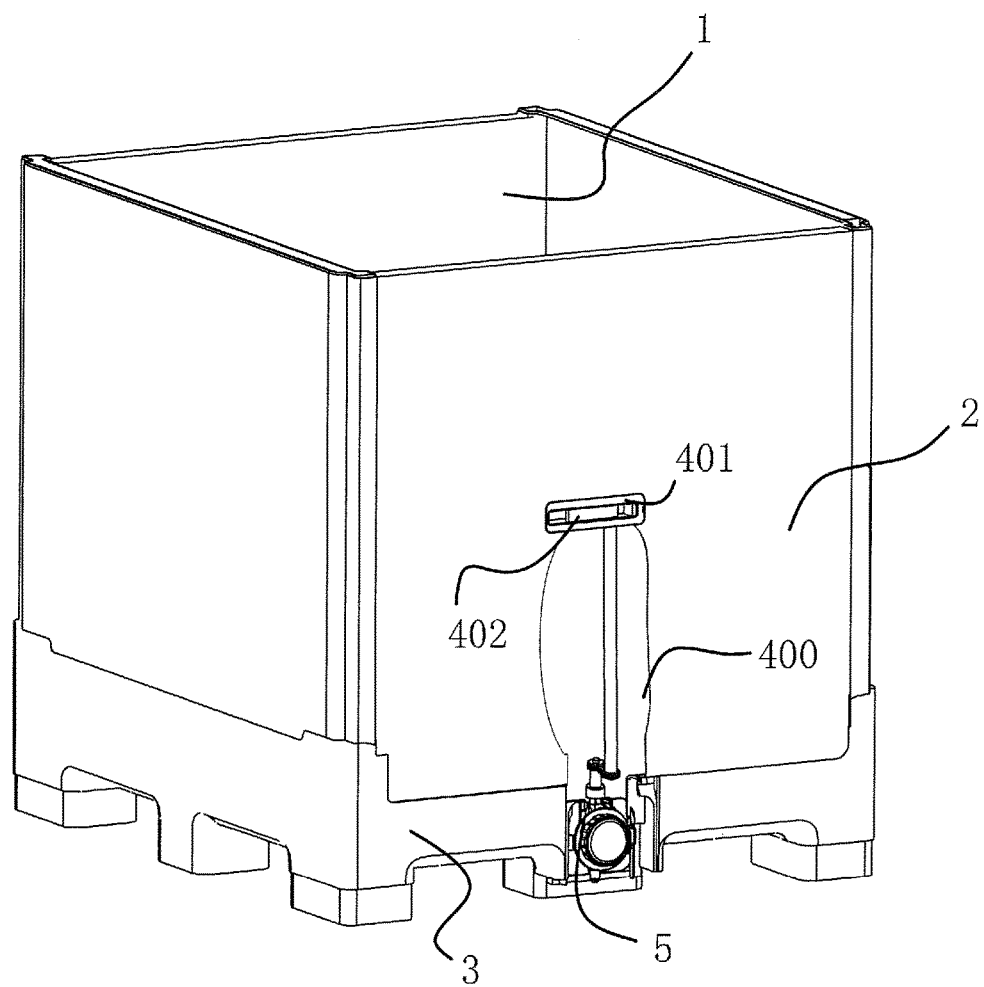
FIG. 1 is a partial sectional view of an intermediate bulk container provided with a valve opening/closing device of the present invention.

Hereinafter, preferred embodiments of the present invention will be described in detail with reference to the drawings, so that the purposes, features and advantages of the present invention will be more clearly understood. It should be understood that embodiments shown in the drawings are not to limit the scope of the invention, but merely to illustrate the true spirit of the technical solution of the present invention.

Herein, the intermediate bulk containers (IBC) are packaging containers widely used in food, biochemical, pharmaceutical, chemical and other industries worldwide. IBC can be reused many times and have distinct advantages for filling, storage and transportation. Compared with barrels, IBC containers can save 35% of the storage space, have dimensions conforming to ISO standards, are suitable for aseptic filling and have a compact structure, are convenient for bulk storage with safety and efficiency, and thus widely used in the transportation, packaging, storage process of liquids, granules, flakes and materials of other forms. Currently, there are three main existing specifications, including 820L, 1000L and 1250L. Typically, the IBC comprises a plastic liner, a filling port, a discharge valve, side plates, a base and a cover. Most of liquids or particles stored in IBC are pharmaceutical intermediates, beverage concentrates, food additives and even dangerous materials, etc., which are not only expensive but also related with sanitation and safety. Therefore, protection functions used to prevent the IBC from unauthorized opening or discharging are needed during operation.

FIG. 1 is a partial sectional view of an intermediate bulk container 1 provided with a valve opening/closing device 400 according to the present invention. The intermediate bulk container 1 comprises a liner (not shown), a side plate 2, a base 3, and a valve 5 provided on the base 3. The valve opening/closing device of an existing intermediate bulk container is typically provided at the valve base, thus an operator has to bend over or squat on the ground to operate when opening or closing the valve, which is very inconvenient.

As shown in FIG. 1, the intermediate bulk container 1 according to the present invention is provided with a valve opening/closing device 400. The valve opening/closing device 400 comprises a handle fixing base 401, a handle 402, a valve opening/closing motion-transferring device, and a valve opening/closing mechanism, wherein the handle fixing base 401 and the handle are installed on the side plate 2 of the container 1. The motion-transferring device can transfer the force applied on the handle to the valve opening/closing mechanism, thus an operator can open or close the valve 5 installed on the base 3 without bending over or squatting on the ground.

Figure 2:
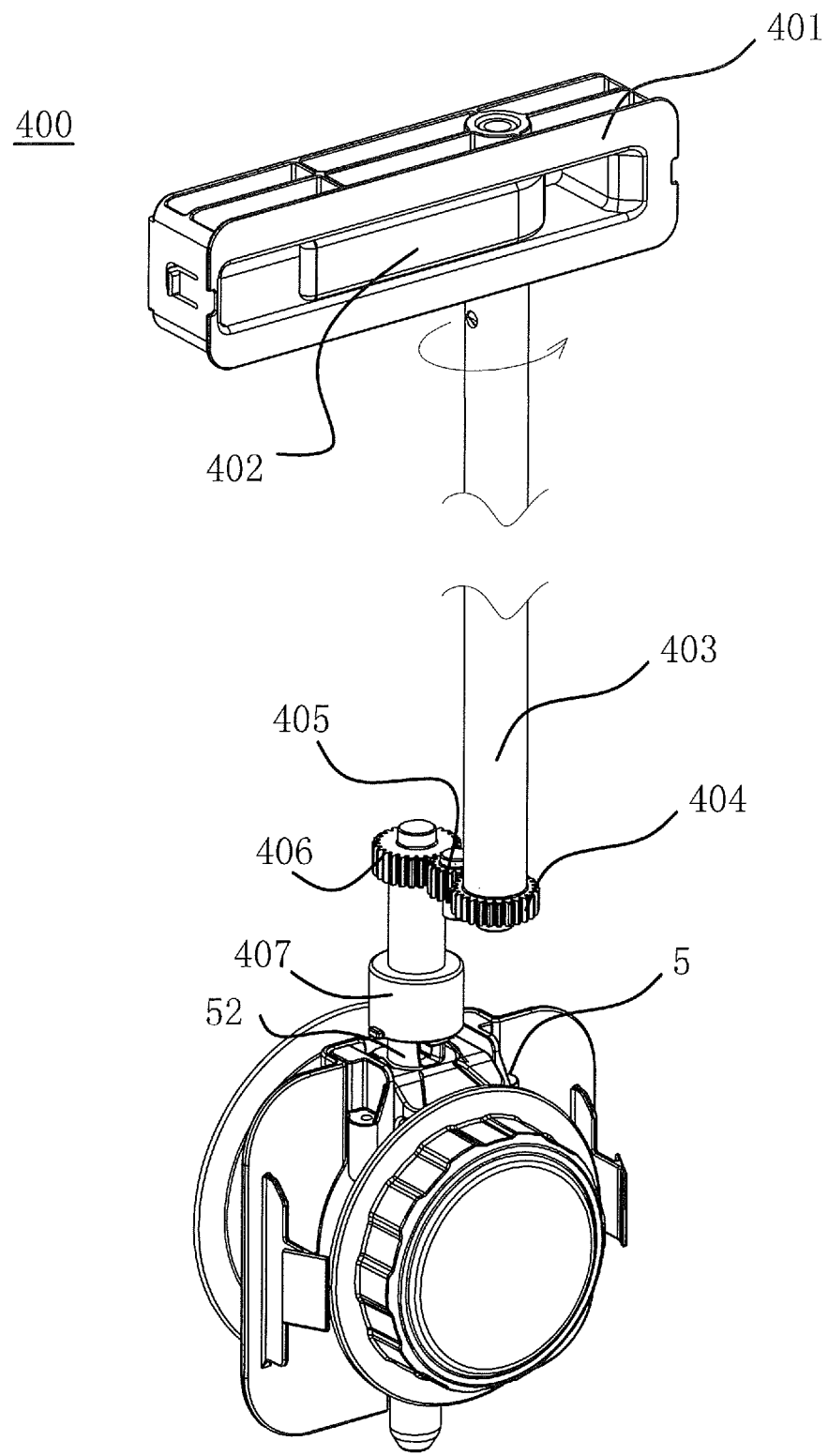
FIG. 2 is a perspective structural view of the valve opening/closing device according to the first embodiment of the present invention.
Figure 3:
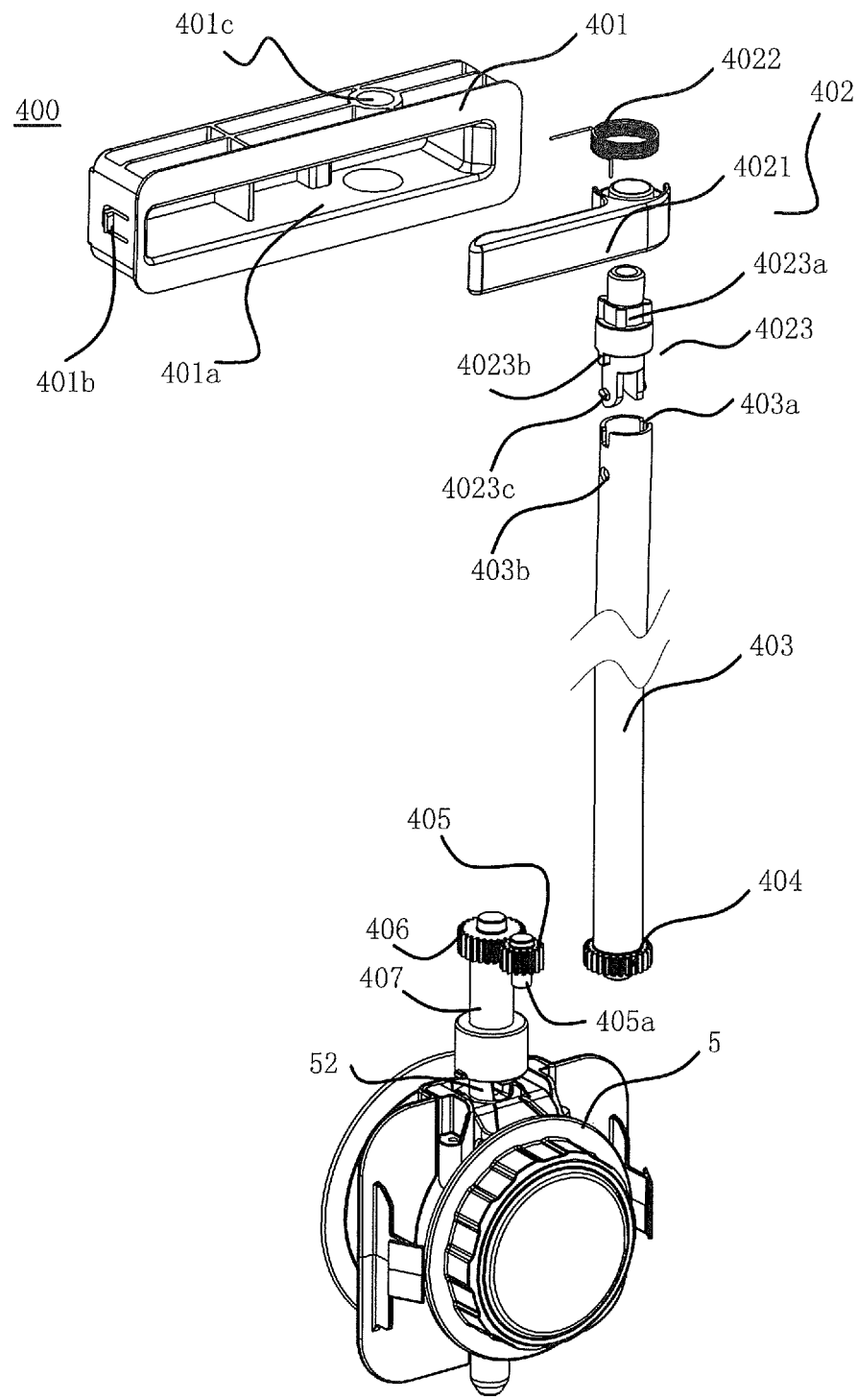
FIG. 3 is an exploded perspective structural view of the valve opening/closing device according to the first embodiment of the present invention.

FIGS. 2-3 show a perspective structural view and an exploded perspective view of the valve opening/closing device 400 according to the first embodiment of the present invention respectively, with some structure not shown for clarity. As shown in FIGS. 2-3, the valve opening/closing device 400 comprises a handle fixing base 401, a handle assembly 402, a transmission rod 403, a driving gear 404, a reversing gear 405, a driven gear 406, a connection rod 407, and a valve stem 52 of the valve. Wherein, the transmission rod 403, the driving gear 404, the reversing gear 405, the driven gear 406, and the connection rod 407 constitute a motion-transferring device of the valve opening/closing device, and the valve stem 52 is the valve opening/closing mechanism.

As shown in FIG. 3, a slot 401a for accommodating the handle, a snap 401b for fixing the handle fixing base to the side plate of the container 1, and a handle rotation center hole 401c are provided on the handle fixing base 401. The handle assembly 402 comprises a handle 4021, a handle return spring 4022, and a handle connection member 4023. A splined hole (not shown) for engaging with a spline 4023a on the handle connection member 4023 and a groove for accommodating the handle return spring 4022 are provided on the root of the handle 4021. The handle 4021, installed in the handle fixing base 401 through the handle connection member 4023, can rotate around the vertical center axis of the handle rotation center hole 401c. A handle limiting projection 4023b and a handle elastic snap 4023c, which are engaged with the transmission rod 403, are provided on the handle connection member 4023 for connecting the handle 4021 to the transmission rod 403. A limiting slot 403a for engaging with the handle limiting projection 4023b and a elastic snap hole 403b for engaging with the handle elastic snap 4023c are provided on one end of the transmission rod 403 accordingly.

The driving gear 404 is integrally provided on the other end of the transmission rod 403. However, it should be noted that the driving gear 404 can be a separate member connected to the transmission rod 403 through means known to those skilled in the art. Two pins 405a, through which the reversing gear 405 is mounted rotatably on the side plate of the container, are provided on both ends of the reversing gear 405 respectively. The driven gear 406 is integrally provided on one end of the connection rod 407. However, it should be noted that the driven gear 406 can be a separate member connected to the connection rod 407 through means known to those skilled in the art.

Figure 4:
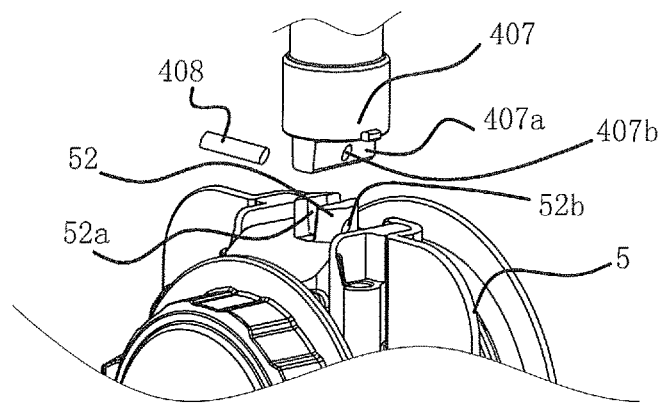
FIG. 4 is a partial perspective view of the valve opening/closing device according to the first embodiment of the present invention.

As shown in FIG. 4, the other end of the connection rod 407 is provided with "" shaped connector 407a, which can be inserted into the "" shaped slot 52a on the valve stem 52. Thus rotation of the connection rod 407 can drive the valve stem 52 to rotate which in turn drives a spool of the valve to rotate, so as to open or close the valve. Preferably, the connection holes 407b and 52b, for accommodating a connection pin 408, are provided on the connector 407a and the valve stem 52 respectively. When the connection pin 408 is inserted into the connection holes 407b and 52b, the connection rod 407 will be connected to the valve stem 52 firmly.

Figure 5:
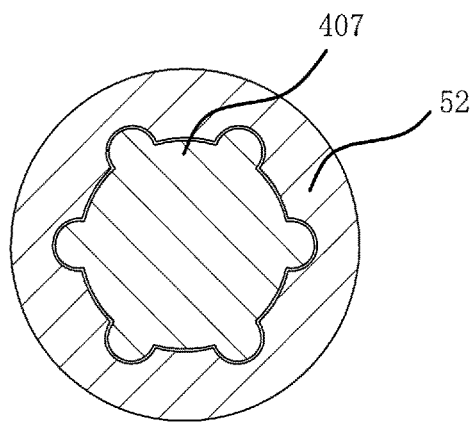
FIG. 5 is a sectional view of a connecting structure of a rod and a valve stem of the valve opening/closing device according to the first embodiment of the present invention.
Figure 6:
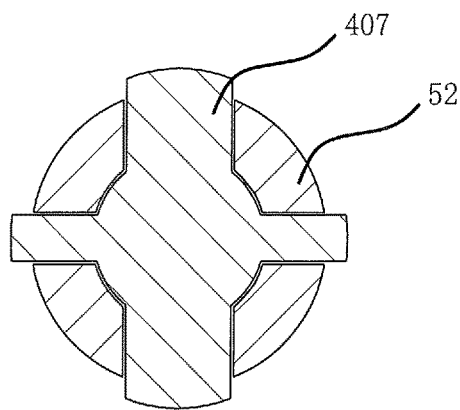
FIG. 6 is a sectional view of another connecting structure of a rod and a valve stem of the valve opening/closing device according to the first embodiment of the present invention.

It should be noted that the connection rod 407 can also be connected to the valve stem 52 though splines, as shown in FIG. 5. Alternatively, the connection rod 407 can be connected to the valve stem 52 through the engagement of "cross shape" slot with "cross shape" projection provided on the connection rod 407 and the valve stem 52 respectively or other applicable ways known to the skilled in the art.

Figure 7:
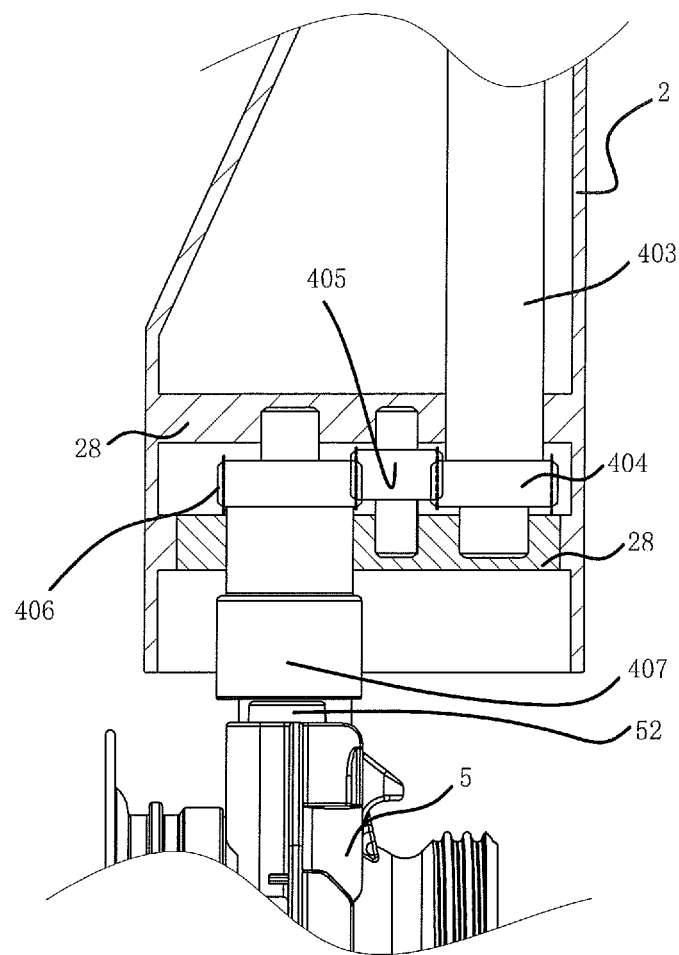
FIG. 7 is a partial sectional view of the valve opening/closing device after assembled according to the first embodiment of the present invention.

FIG. 7 shows a partial sectional view of the motion-transferring device after installed. As shown in FIG. 7, the side plate of the container is provided with a mounting seat 28 for accommodating the driving gear, the reversing gear, and the driven gear, wherein the driving gear, the reversing gear, and the driven gear can rotate in the mounting seat 28. The transmission rod 403 and the driving gear 404 will be driven to rotate when the handle 402 rotates, while the reversing gear 405 is driven to rotate by the rotation of the driving gear 404 which in turn drives the driven gear 406 and the connection rod 407 to rotate. The rotation of the rod 407 drives the valve stem 52 to rotate which in turn drives the spool of the valve to rotate, so as to open or close the valve. It should be noted that the moment applied to the handle can be adjusted by setting appropriate transmission ratio as required.

Figure 8:
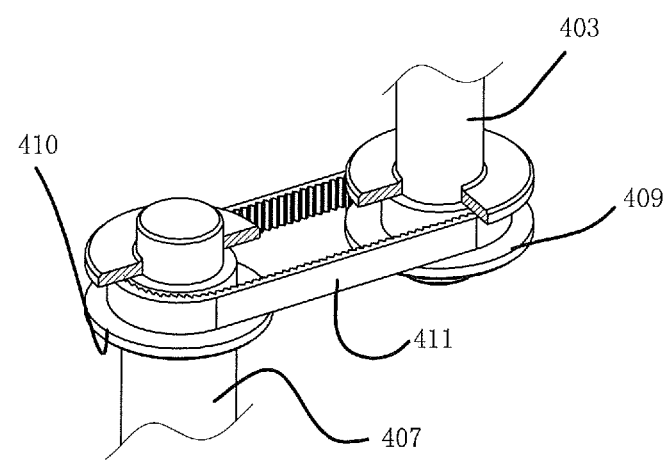
FIG. 8 is a partial perspective view of a motion-transferring device in the valve opening/closing device changed according to the first embodiment of the present invention.

In the above embodiment, transmission between the transmission rod 403 and the connection rod 407 can also be achieved by providing a pulley group, as shown in FIG. 8. The pulley group comprises a driving pulley 409 and a driven pulley 410, wherein the driving pulley 409 is provided on one end of the transmission rod 403 and the driven pulley 409 is provided on one end of the connection rod 410. The driving pulley 409 can be connected to the driven pulley 410 through a belt 411, so that the driving pulley 409 can drive the driven pulley 410 and the connection rod 410 to rotate, which in turn drives a spool of the valve to rotate, so as to open or close the valve. It should be noted that the moment applied to the handle can be adjusted by setting appropriate transmission ratio as required.

Figure 9:
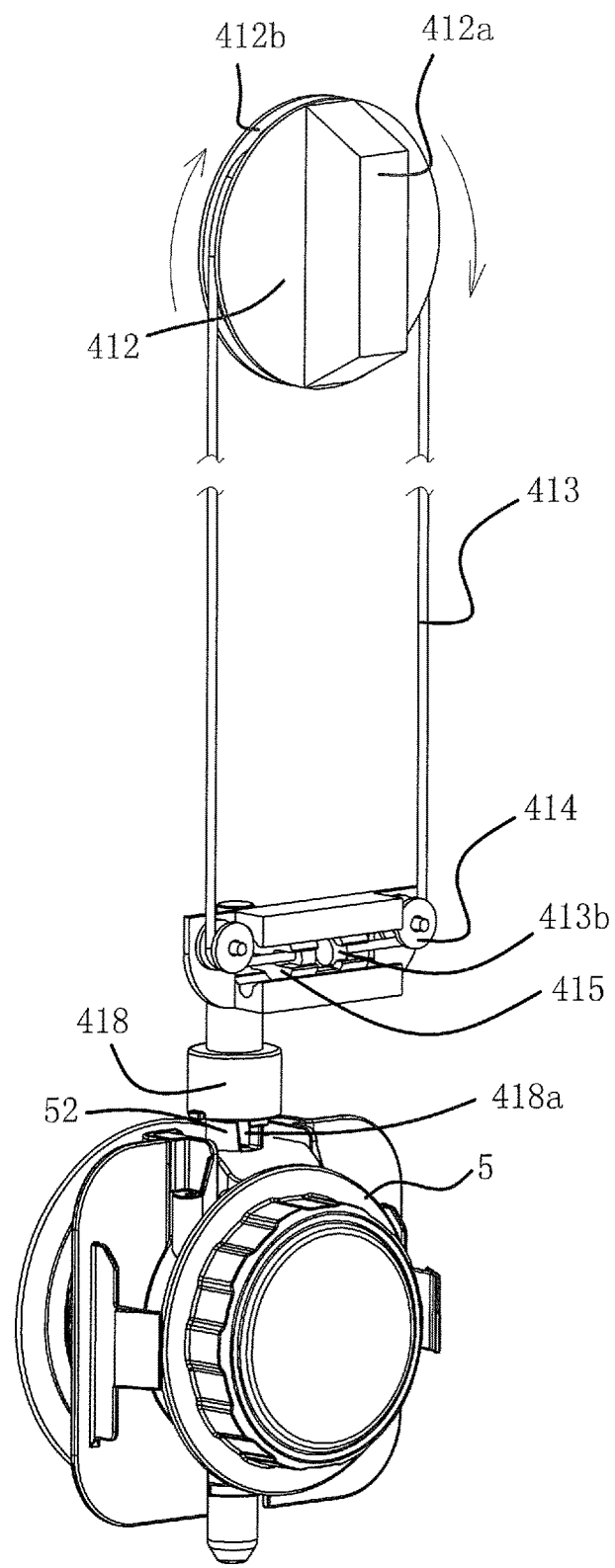
FIG. 9 is a perspective structural view of the valve opening/closing device according to the second embodiment of the present invention.
Figure 10:
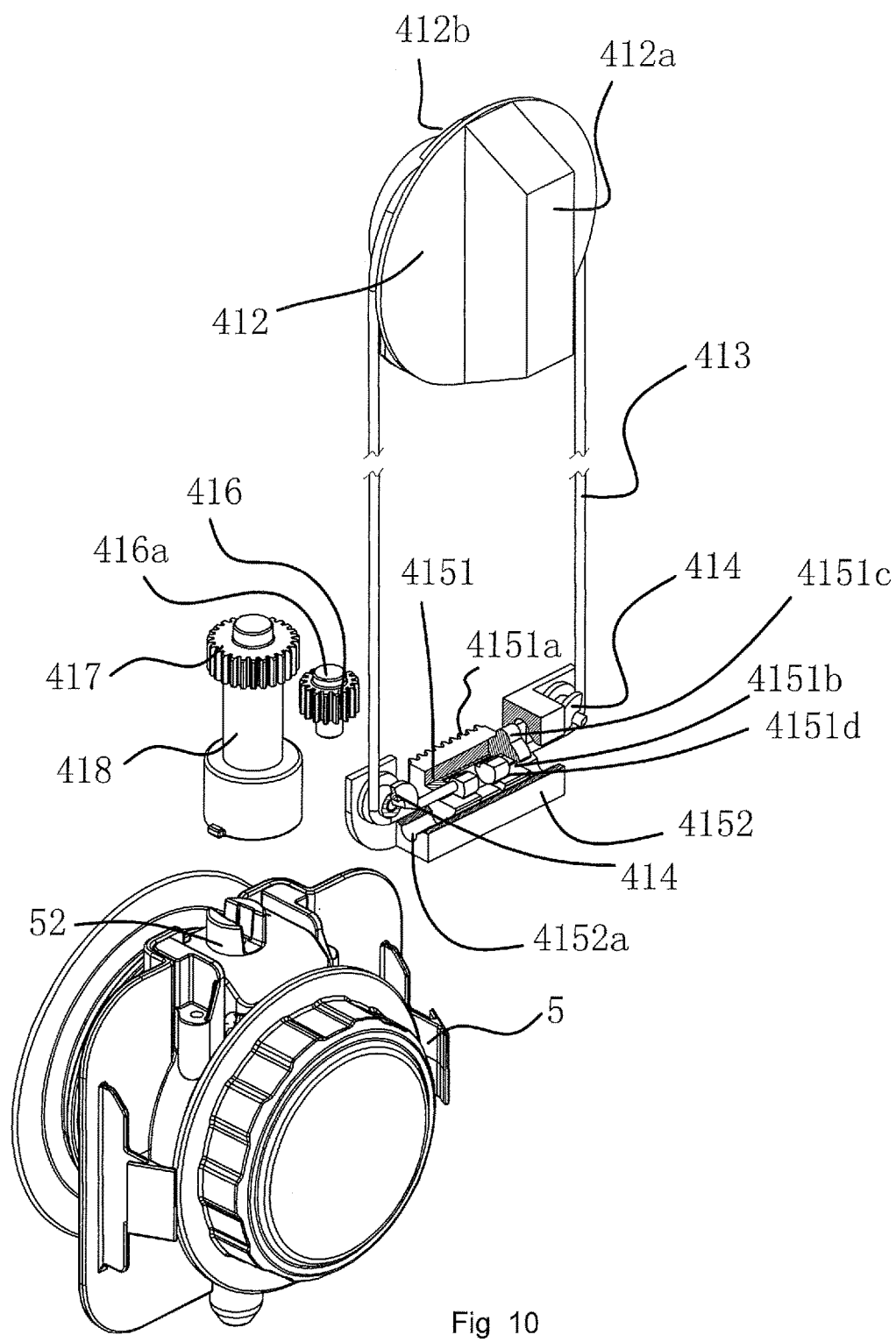
FIG. 10 is an exploded perspective structural view of the valve opening/closing device according to the second embodiment of the present invention.
Figure 11:
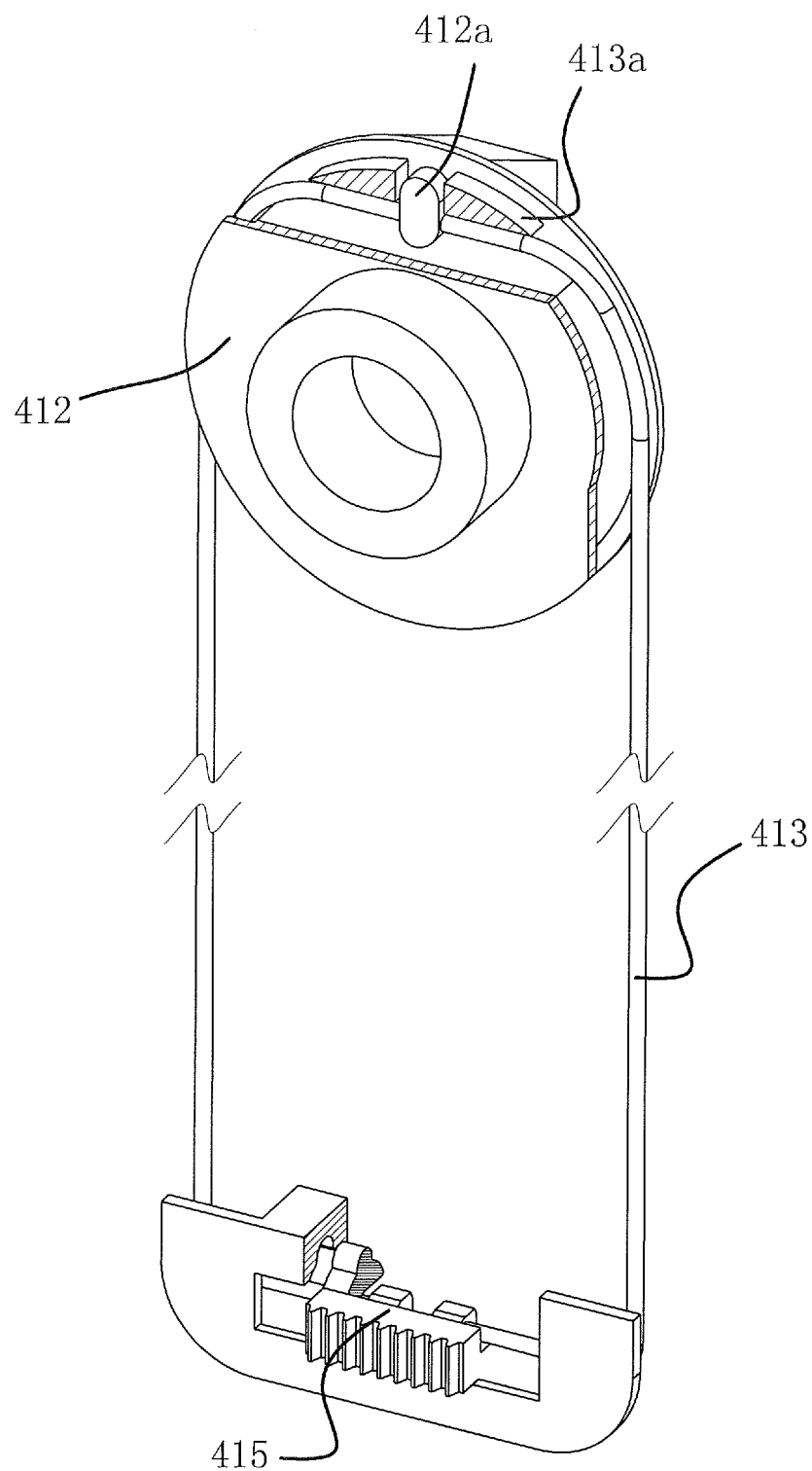
FIG. 11 is a perspective view of a motion-transferring device of the valve opening/closing device according to the second embodiment of the present invention, with some structure not shown for clarity.

FIGS. 9-13 show the valve opening/closing device 400 according to the second embodiment of the present invention. As shown in FIGS. 9-11, the valve opening/closing device 400 comprises a handle 412, a steel rope 413, a pulley assembly 414, a rack assembly 415, a reversing gear 416, a driven gear 417, a connection rod 418, and a valve stem 52. Wherein the steel rope 413, the pulley assembly 414, the rack assembly 415, the reversing gear 416, the driven gear 417, and the connection rod 418 constitute the motion-transferring device and the valve stem 52 is the valve opening/closing mechanism. The handle 412 is provided with a grip 412a, a steel rope slot 412b, and a rotation axle 412d, wherein a steel rope limiting block 412a is provided in the steel rope slot 412b for limiting movement of a steel rope limiting pin 413a relative to the handle, so that the steel rope 413 can move synchronously with the rotation of the handle 412, which will be described in more detail hereinafter. The steel rope limiting pin 413a is located near the middle of the steel rope 413 and two steel rope fixing heads 413b are provided on both ends of the steel rope 413 respectively.

The rack assembly 415 comprises a rack 4151 and a rack seat 4152, wherein one side of the rack 4151 is provided with multiple teeth 4151a and the other side of the rack 4151 is provided with a sliding portion 4151b. Guide projections 4151c, which can slide along the slot 4152a of the rack seat 4152, are provided on both sides of the sliding portion 4151b, and a groove 4151d for accommodating the steel rope fixing heads 413b is provided in the middle of the sliding portion 4151b. An opening 4152b for accommodating the reversing gear 416 and an opening 4152c for accommodating the connection rod 417 are provided on the rack seat 4152, as shown in FIG. 12.

The pulley assembly 414 comprises pulley 4141 and pulley 4142 provided on the both sides of the rack 4151 respectively. Two ends of the reversing gear 416 are provided with two pins 416a, through which the reversing gear 416 is mounted rotatably on the side plate of the container. The driven gear 417 is integrally provided on one end of the connection rod 418, however, it should be noted that the driven gear 417 can be a separate member connected to the connection rod 418 through means known to those skilled in the art.

As shown in FIGS. 9-10, the other end of the connection rod 418 is provided with a "" shaped connector 418a, which can be inserted into the "" shaped slot 52a of the valve stem 52, thus the rotation of the connection rod 418 can drive the valve stem 52 to rotate which in turn drives a spool of the valve to rotate, so as to open or close the valve. It should be noted that the connection rod 418 can be connected to the valve stem 52 though splines. Alternatively, the connection rod 418 can be connected to the valve stem 52 through a engaging of a "cross shape" slot with a "cross shape" projection provided on the connection rod 418 and the valve stem 52 respectively or other applicable ways known to those skilled in the art.

Figure 12:
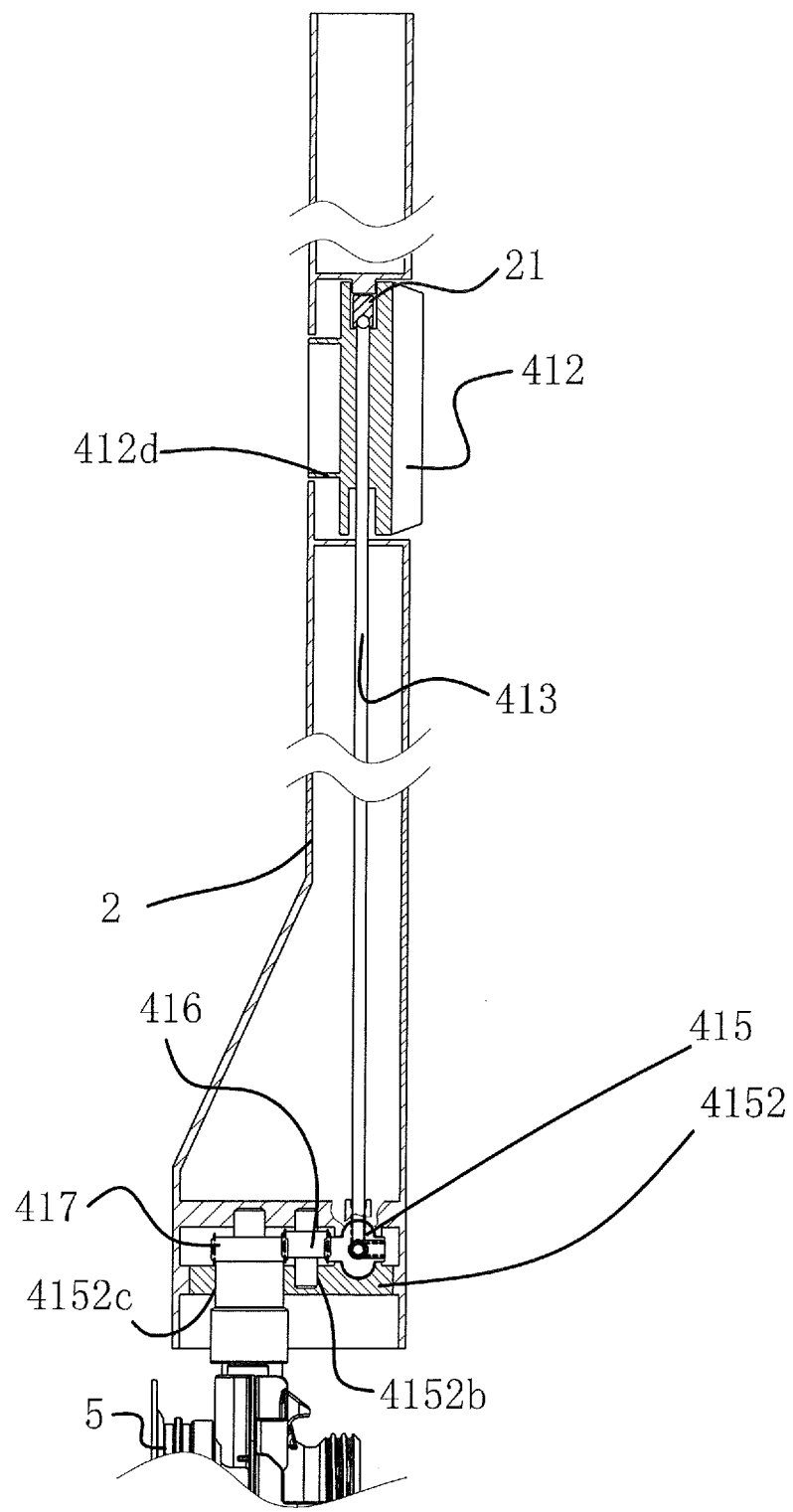
FIG. 12 is a sectional view of the valve opening/closing device after assembled according to the second embodiment of the present invention.
Figure 13:
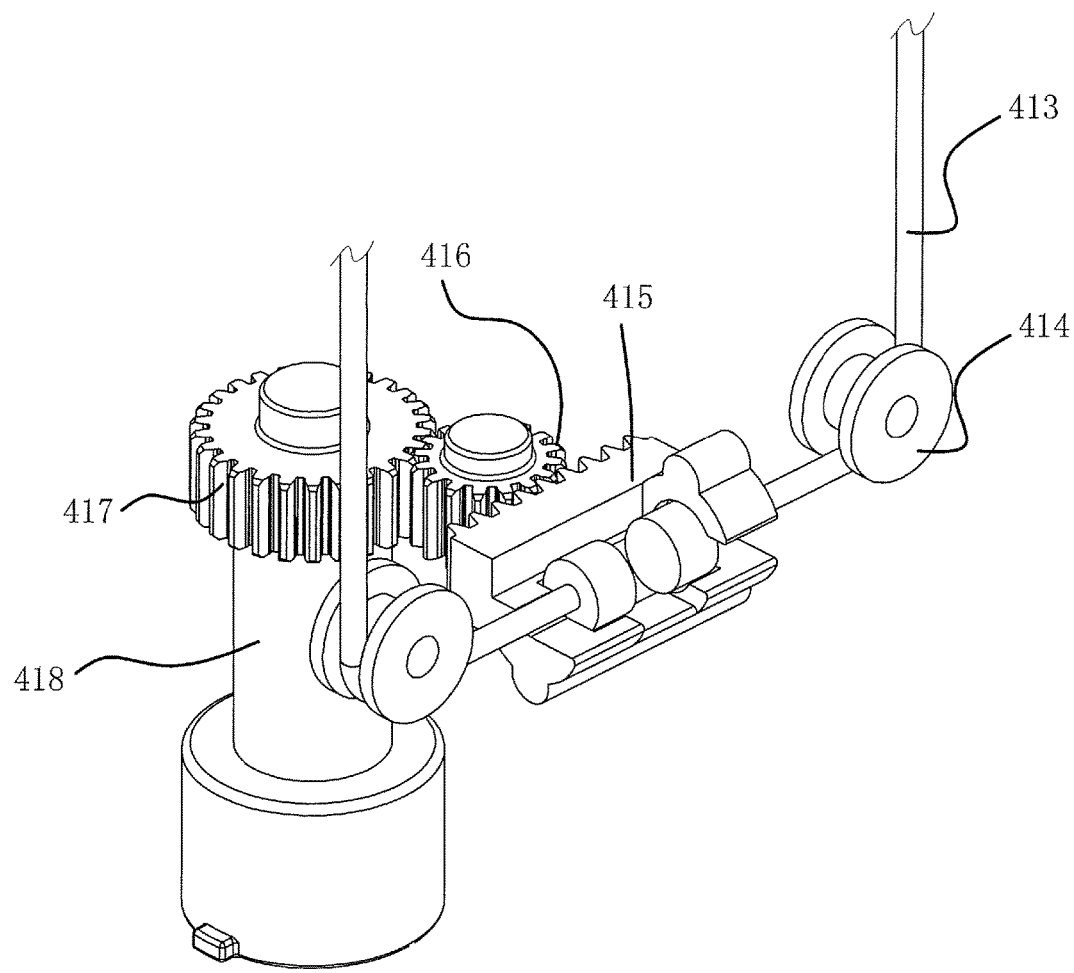
FIG. 13 is a partial perspective view of the valve opening/closing device after assembled according to the second embodiment of the present invention.

As shown in FIGS. 12-13, the handle 401 is mounted on the side plate and located by the handle limiting projection 21 of the side plate, so it can rotate around the rotation axis of the rotation axle 412d, which is perpendicular to the side plate of the container. The steel rope 413 surrounds the pulley assembly and the steel rope fixing head is located in the groove 4151d. Both the reversing gear 416 and the connection rod 418 are mounted in the corresponding structures of the side plate and the rack fixed seat respectively, wherein the reversing gear 416 is engaged with the rack 4151 and the driven gear 417 is engaged with the reversing gear 416. The connector provided on one end of the connection rod 418 is mounted in the connection slot provided on the valve stem 52.

When the handle rotates, the steel rope will be driven to rotate around the pulley and reciprocate along the slot 4152a of the rack seat 4152 which in turn drives the rack to reciprocate. The reciprocation of the rack drives the reversing gear and the driven gear to rotate which in turn drives the connection rod and the valve stem to rotate, so as to open or close the valve.

Figure 14:
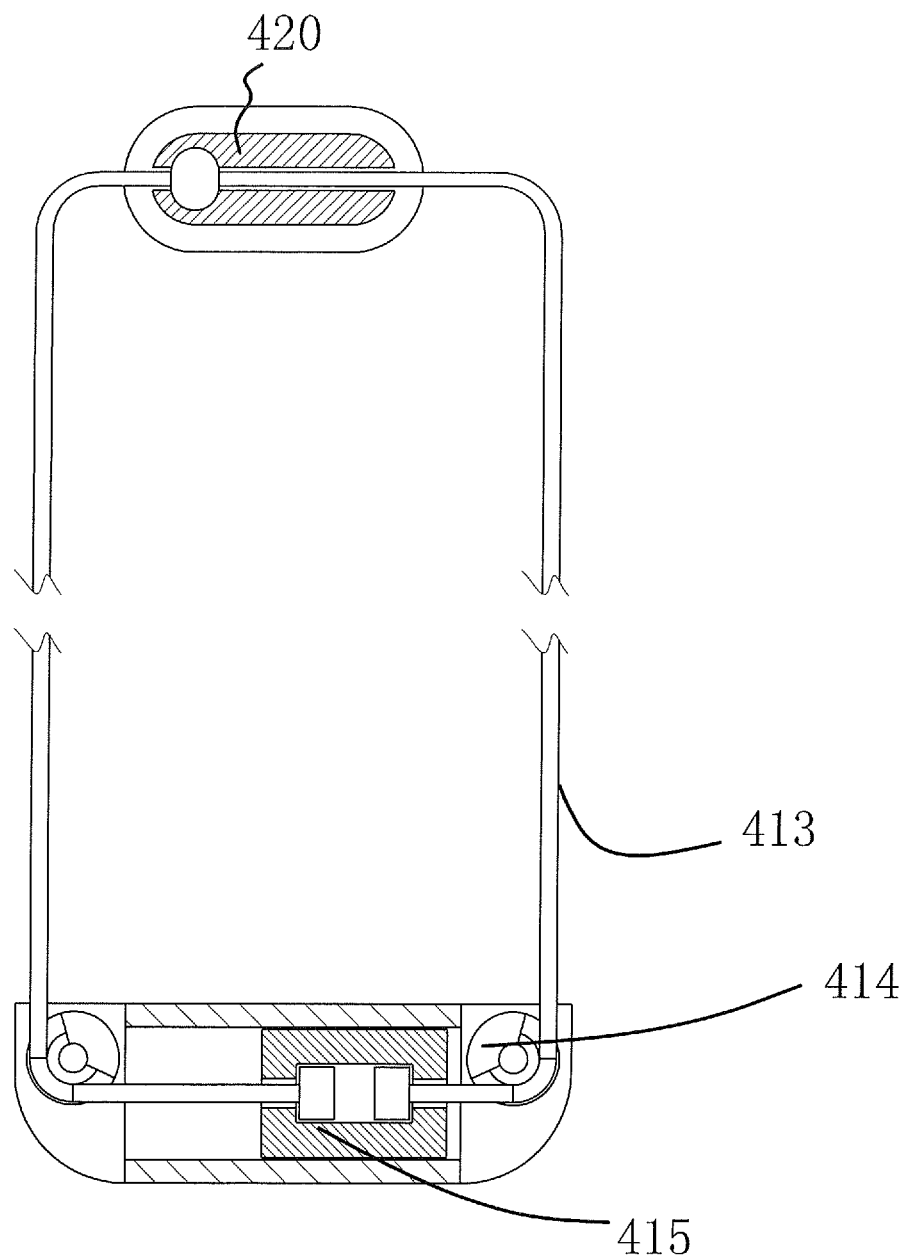
FIG. 14 is a sectional view of the valve opening/closing device according to the third embodiment of the present invention.
Figure 15:
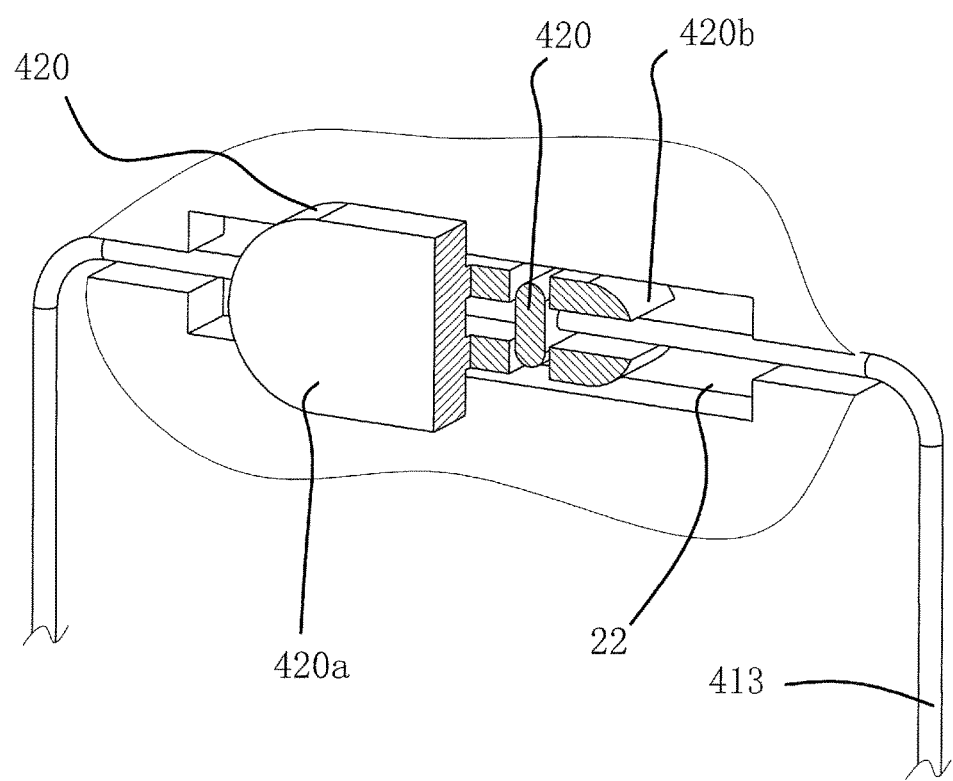
FIG. 15 is a partial sectional view of a handle of the valve opening/closing device according to the third embodiment of the present invention.

FIGS. 14-15 show the valve opening/closing device 400 according to the third embodiment of the present invention. The difference between the third embodiment and the second embodiment is the structure of the handle and the way of movement of the handle. The remaining of the third embodiment is same with the second embodiment, which will not be elaborated here. As shown in FIGS. 13-14, a grip 420a and a steel rope limiting projection 420b which limits reciprocation of the steel rope limiting pin 413a relative to the handle are provided on the handle 420 and functions as a sliding member. Thus the handle will slid along the slot of the side plate when the steel rope limiting projection 420b as a sliding member slides, and the sliding of the handle will drive the steel rope 413 to move synchronously.

When installed, the handle is snapped into the slot 22 of the side plate and moves along the slot 22. The movement of the handle will drive the steel rope to rotate around the pulley and move along the slot of the rack seat. The movement of the steel rope will drive the rack to move which in turn drives the reversing gear and the driven gear to rotate and further drives the connection rod and the valve stem to rotate, so as to open or close the valve.

Figure 16:
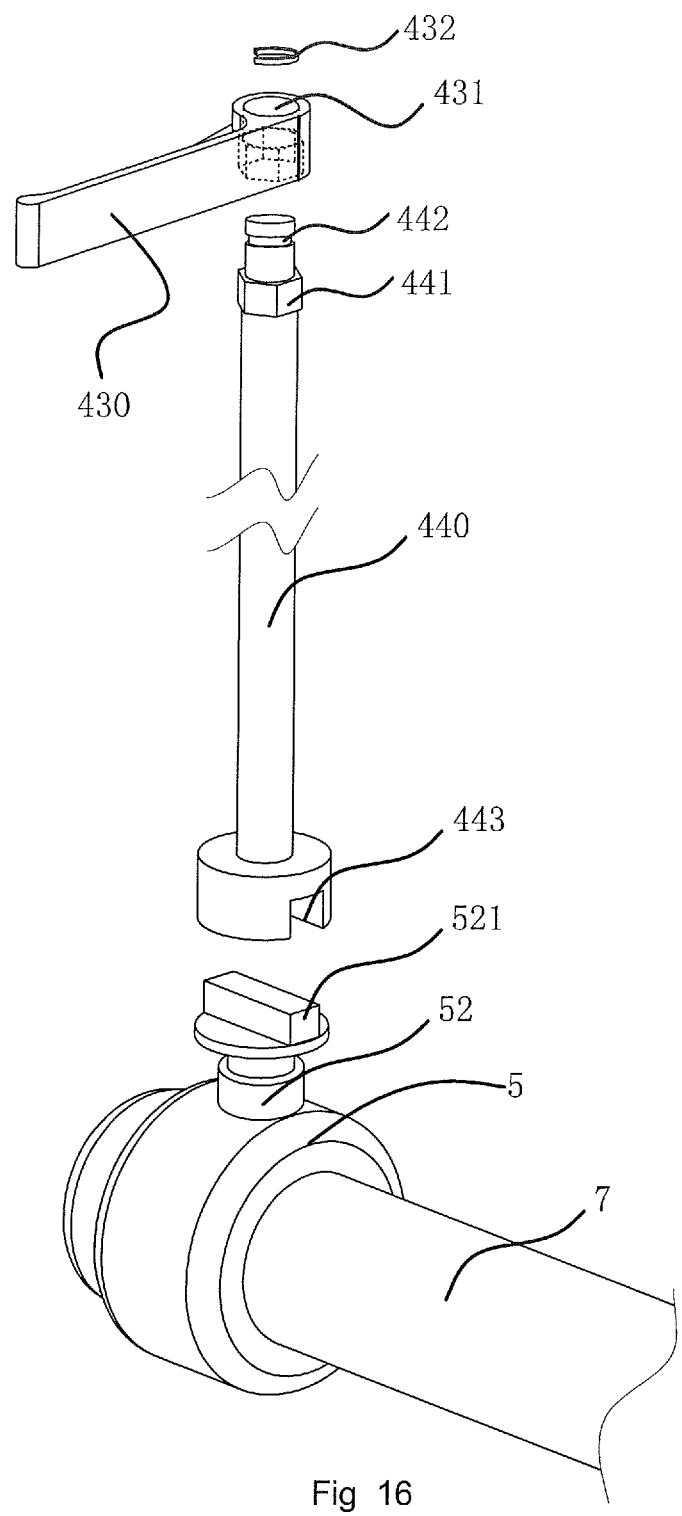
FIG. 16 is an exploded perspective view of the valve opening/closing device according to the third embodiment of the present invention.
Figure 17:
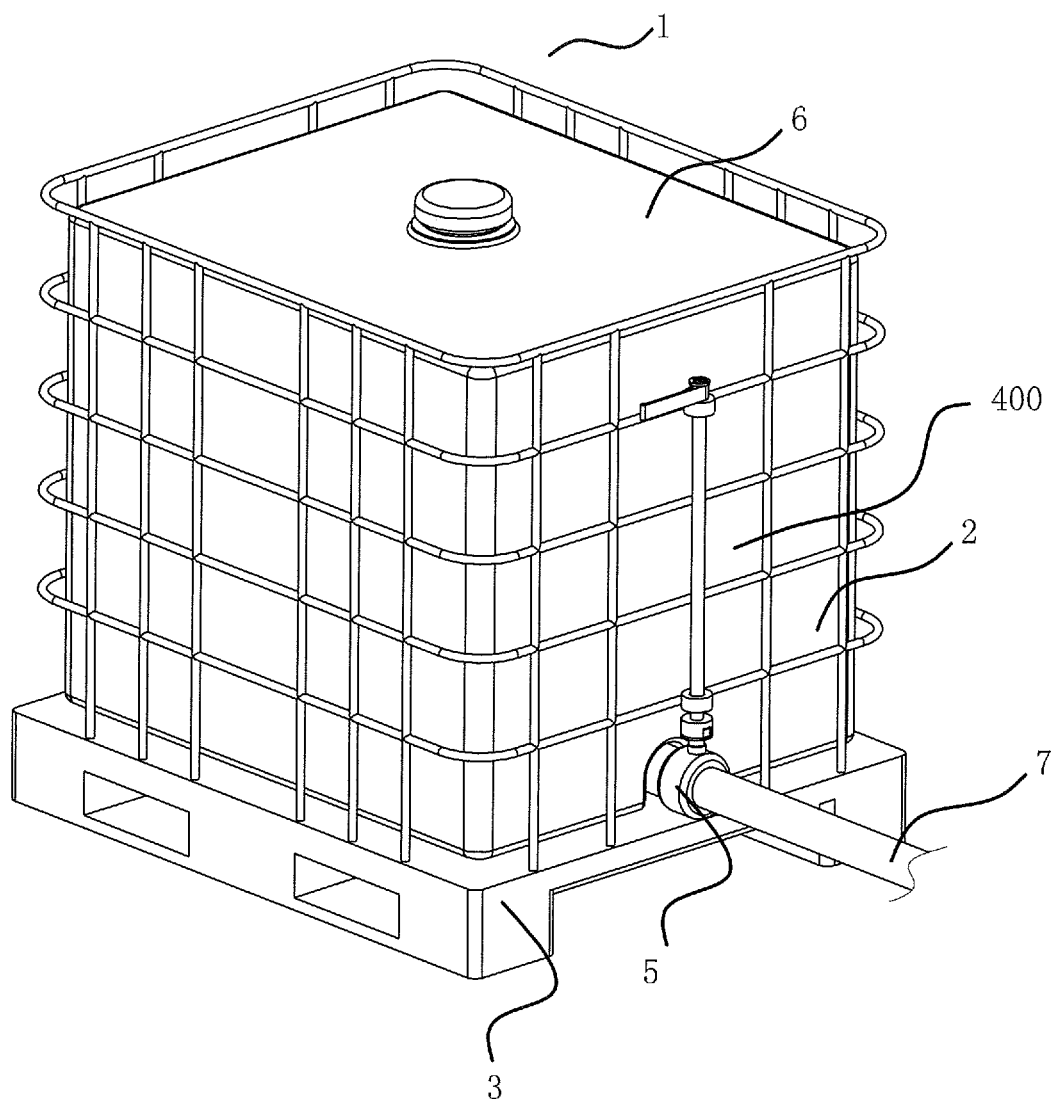
FIG. 17 is a perspective view of an intermediate bulk container provided with the valve opening/closing device according to third embodiment of the present invention.

FIGS. 16-17 show the valve opening/closing device 400 according to the fourth embodiment of the present invention. When the central axis of the handle coincides with the central axis of the valve stem, the handle can be directly connected to the valve stem through the transmission rod, thus rotating of the handle can drive the valve stem to rotate which in turn drives the spool to rotate, so as to open or close the valve.

As shown in FIG. 16, a spline 441 for engaging with the handle 430 and a ring groove 442 for engaging with the handle buckle 432 are provided on one end of the transmission rod 440, and the other end of the transmission rod 440 is provided with a "" shaped slot for accommodating the valve stem. Accordingly, the handle 430 is provided with a splined hole 431 and the valve stem is provided with a shaped projection 521. When installed, the spline 441 of the transmission rod 440 is inserted into the splined hole 431 of the handle, and then the handle buckle 432 is snapped into the ring groove 442 so as to prevent the transmission rod 440 from disengaging out of the handle 430. The "" shaped projection of the valve stem is snapped into the "" shaped slot of the transmission rod 440, so that the rotation of the handle can drive the valve stem to rotate. It should be noted that the transmission rod and the handle, as well as the transmission rod and the valve stem, can be connected though other connection means known to those skilled in the art.

FIG. 17 shows a perspective view of the intermediate bulk container provided with the valve opening/closing device 400. As shown in FIG. 17, the intermediate bulk container 1 comprises a base 3, a side plate 2, a liner 6, and a valve 5. The valve 5 is installed on the base 3. The valve opening/closing device 400 is installed on the side plate 2 through a fixed ring 25 provided on the side plate 2. An outlet of the valve 5 may be connected to the pipeline 7. To open or close the valve, an operator only need to rotate the handle, rather than bend over or squat on the ground to operate.

It should be noted that in the above embodiments, the handle can be designed to have different shapes, sizes and are applied by forces from different directions, such as pulling force, pressing force, and so on. The moving way of the handle can be in the form of rotation on a plane, moving along a plane or axial, radial pressing form, and so on.

The motion-transferring device can be gear transmission, pulley transmission, or combination thereof. The motion-transferring device can be connected to the valve opening/closing mechanism (i.e. the valve stem) through the connection means of shape, "cross" shape, or spline, and so on.

In addition, the operating moment can be adjusted through adjusting the transmission ratio of the motion-transferring device, so that the valve can be opened or closed conveniently.

Further, the valve opening/closing device of the present invention may used in a variety of valves, such as ball valves, butterfly valves and the like.

For the valve opening/closing device according to the present invention, the operating handle is provided at an appropriate position at the side plate of the container, thereby avoiding bending over or squatting on the ground, etc when opening or closing the valve, facilitating use. Further, the motion-transferring device can installed on the outside or inside of the side plate. When it is installed inside the side plate, in use, the overall volume ratio of the intermediate bulk container will not be affected, and level of folding will not be increased when folding the intermediate bulk container. Moreover, the operating handle or lever on the side plate can be made with moment arms of different sizes, different lengths, or the operating movement can be changed through adjusting the transmission ratio of the motion-transferring device, which makes it easy to control the operating force.

Preferred embodiments of the present invention has been described in detail above, while it is to be understood that, after reading the above teachings of the present invention, those skilled in the art may make various modifications or amendments to the present invention. These equivalent forms still fall into the scope limited by appended claims of the present application.

What is claimed is:

1. An intermediate bulk container, comprising:
    a base;
    a side plate;
    a valve provided on the base; and
    a valve opening/closing device, wherein
    the valve opening/closing device comprises a handle, a motion-transferring device, and a valve opening/closing mechanism,
    the opening/closing mechanism is a valve stem, the handle is mounted on the side plate and connected to the motion-transferring device, and the motion-transferring device is mounted on the side plate and used to transfer the force applied on the handle to the valve, so as to open or close the valve,
    the motion-transferring device comprises a transmission rod, a driving gear, a reversing gear, a driven gear, and a connection rod,
    one end of the transmission rod is connected to the handle and the other end of the transmission rod is connected to the driving gear,
    one end of the connection rod is connected to the valve opening/closing mechanism and the other end of the connection rod is connected to the driven gear, and
    the driving gear is engaged with the reversing gear and the reversing gear is engaged with the driven gear.

2. The intermediate bulk container as claimed in claim 1, wherein the valve stem is connected to the connection rod.

3. The intermediate bulk container as claimed in claim 1, wherein the handle is mounted on the side plate of the container though a handle fixing base and can rotate around a vertical axis.

4. An intermediate bulk container, comprising:
a base;
a side plate;
a valve provided on the base; and
a valve opening/closing device, wherein
the valve opening/closing device comprises a handle, a motion-transferring device, and a valve opening/closing mechanism, and
the opening/closing mechanism is a valve stem, the handle is mounted on the side plate and connected to the motion-transferring device, and the motion-transferring device is mounted on the side plate and used to transfer the force applied on the handle to the valve, so as to open or close the valve,
the motion-transferring device comprises a transmission rod, a driving pulley, a driven pulley, a belt, and a connection rod,
one end of the transmission rod is connected to the handle and the other end of the transmission rod is connected to the driving pulley,
one end of the connection rod is connected to the valve opening/closing mechanism and the other end of the connection rod is connected to the driven pulley, and
the driven pulley is driven by the driving pulley through the belt.

5. An intermediate bulk container, comprising:
a base;
a side plate;
a valve provided on the base; and
a valve opening/closing device, wherein
the valve opening/closing device comprises a handle, a motion-transferring device, and a valve opening/closing mechanism, and
the opening/closing mechanism is a valve stem, the handle is mounted on the side plate and connected to the motion-transferring device, and the motion-transferring device is mounted on the side plate and used to transfer the force applied on the handle to the valve, so as to open or close the valve,
the motion-transferring device comprises a steel rope, a pulley assembly, a rack assembly, a reversing gear, a driven gear, and a connection rod,
the steel rope is connected to the handle and the pulley assembly, and can move synchronously with the rotation of the handle,
the steel rope is further connected to the rack assembly so that the rack assembly can move synchronously with the movement of the steel rope,
one end of the connection rod is connected to the valve opening/closing mechanism and the other end of the connection rod is connected to the driven rod, and
the rack assembly is engaged with the reversing gear and the reversing gear is engaged with the driven gear.

6. The intermediate bulk container as claimed in claim 5, wherein
the handle is provided with a grip, a steel rope slot and a rotation axle, and can rotate around the rotation axis of the rotation axle,
the rack assembly comprises a rack and a rack seat, wherein the steel rope is connected to the rack through steel rope fixing heads and can slide along a slot of the rack seat.

7. The intermediate bulk container as claimed in claim 5, wherein
the handle is provided with a grip and a steel rope limiting block, and
the steel rope limiting block limits movement of the steel rope relative to the handle and functions as a slid member, thus the handle can slid along the slot of the side plate and the steel rope can move synchronously when the handle slides.

8. An intermediate bulk container, comprising:
a base;
a side plate;
a valve provided on the base; and
a valve opening/closing device, wherein
the valve opening/closing device comprises a handle, a motion-transferring device, and a valve opening/closing mechanism, and
the handle is mounted on the side plate and connected to the motion-transferring device, and the motion-transferring device is used to transfer the force applied on the handle to the valve, so as to open or close the valve,
the motion-transferring device comprises a transmission rod, a driving gear, a reversing gear, a driven gear, and a connection rod,
one end of the transmission rod is connected to the handle and the other end of the transmission rod is connected to the driving gear,
one end of the connection rod is connected to the valve opening/closing mechanism and the other end of the connection rod is connected to the driven gear, and
the driving gear is engaged with the reversing gear and the reversing gear is engaged with the driven gear.

9. An intermediate bulk container, comprising:
a base;
a side plate;
a valve provided on the base; and
a valve opening/closing device, wherein
the valve opening/closing device comprises a handle, a motion-transferring device, and a valve opening/closing mechanism, and
the handle is mounted on the side plate and connected to the motion-transferring device, and the motion-transferring device is used to transfer the force applied on the handle to the valve, so as to open or close the valve,
the motion-transferring device comprises a transmission rod, a driving pulley, a driven pulley, a belt, and a connection rod,
one end of the transmission rod is connected to the handle and the other end of the transmission rod is connected to the driving pulley,
one end of the connection rod is connected to the valve opening/closing mechanism and the other end of the connection rod is connected to the driven pulley, and
the driven pulley is driven by the driving pulley through the belt.

* * * * *